United States Patent [19]

Hashimoto

[11] 4,194,089
[45] Mar. 18, 1980

[54] AUTOMATIC ANSWERING TELEPHONE SET HAVING AN ENDLESS TAPE WITH A PLURALITY OF SELECTIVE TRACKS

[75] Inventor: Kazuo Hashimoto, Tokyo, Japan

[73] Assignee: Hashimoto Corporation, Tokyo, Japan

[21] Appl. No.: 837,814

[22] Filed: Sep. 29, 1977

[30] Foreign Application Priority Data

Sep. 30, 1976 [JP] Japan .................. 51-117706

[51] Int. Cl.² ............... H04M 1/64; H04M 1/65
[52] U.S. Cl. ........................... 179/6 E; 179/6 C; 179/100.1 PS
[58] Field of Search ............. 179/6 C, 6 GE, 6 R, 179/100.1 PS, 100.1 DR, 100.1 VC

[56] References Cited

U.S. PATENT DOCUMENTS

| | | | |
|---|---|---|---|
| 3,286,033 | 11/1966 | Lemelson | 179/G E |
| 3,804,993 | 4/1974 | Honnold et al. | 179/6 E |
| 3,858,006 | 12/1974 | Tomita | 179/6 E |
| 4,005,270 | 1/1977 | Darwood | 179/6 E |
| 4,041,249 | 8/1977 | Matz et al. | 174/6 E |
| 4,122,306 | 10/1978 | Friedman et al. | 179/6 E |

FOREIGN PATENT DOCUMENTS 421059 12/1934 United Kingdom ............... 179/6 E

Primary Examiner—Bernard Konick
Assistant Examiner—Donald McElheny, Jr.

Attorney, Agent, or Firm—Gerald J. Ferguson, Jr.; Joseph J. Baker

[57] ABSTRACT

An automatic answering telephone set has a pre-recorded message for a general calling party a pre-recorded message only for a specified calling party, means for changing the content of the pre-recorded message for the specified calling party by a person in a position to give the message, and means for indicating whether or not the messages for the general calling party and the specified calling party have been reproduced and sent to them. The message for the general calling party is recorded in the first half area of one track of an endless magnetic tape and the message for the specified calling party is recorded in the latter half area of another track of the magnetic tape. The messages are reproduced by a magnetic head selecting the tracks. The magnetic head normally lies at the track having the message for the general calling party. Accordingly, when a telephone channel is formed based on a ringing signal from an outside telephone set, the magnetic head reproduces and sends first the message for the general calling party then the magnetic head select and produces a track having the message for the specified calling party. Where the call information for the specified calling party has a specified content used by the person in a position to give the message for the specified calling party, the magnetic head serves as a recording head to change the content of the message for the specified calling party recorded on the track of the magnetic tape.

4 Claims, 2 Drawing Figures

AUTOMATIC ANSWERING TELEPHONE SET HAVING AN ENDLESS TAPE WITH A PLURALITY OF SELECTIVE TRACKS

BACKGROUND OF THE INVENTION

1. Field of the Invention

This invention relates to an automatic answering telephone set.

2. Description of the Prior Art

Some conventional types of automatic answering telephone sets have only a function of reproducing and sending a pre-recorded message for an unspecified calling party from an outside telephone set (which party will hereinafter be referred to as the general calling party). The abovesaid function will hereinafter be referred to as the for-general-calling-party message reproducing and sending function. Some other prior art automatic answering telephone sets have another function of recording a message from the general calling party (which function will hereinafter be referred to as the general calling party message function).

However, such conventional automatic answering telephone sets do not have a function of sending a specified message only to a specified calling party.

In view of the above, there has recently been proposed an automatic answering telephone set which has a function of reproducing and sending a pre-recorded message for the specified calling party from an outside telephone set.

However, such an automatic answering telephone set is bulky and complicated in construction and is expensive.

The automatic answering telephone set having such a for-specified-calling-party message reproducing and sending function is designed so that the function is fulfilled by the use of call information assigned to the specified calling party.

Accordingly, in the case of such an automatic answering telephone set, if the general calling party happens to become acquainted with the content of the call information for the specified calling party call information, there is the possibility that the general calling party learns the message for the specified calling party using the call information for the specified calling party.

This can be avoided by changing the content of the call information for the specified calling party if it is seen or considered that the general calling party has learned the content of the call information for the specified calling party.

Accordingly, it is desired that the automatic answering telephone set having the for-specified-calling-party message reproducing and sending function has such a construction that it may readily accord with a change in the content of the call information for the specified calling party.

Further, it will be very convenient if the automatic answering telephone set having the for-specified-calling-party message reproducing and sending function has such a function that the content of the pre-recorded message for the specified calling party can be changed from an outside telephone set by a person in a position to give the message for the specified calling party message. (This function will hereinafter be referred to as the for-specified-calling-party message content changing function.)

Further, it will be very convenient if the automatic answering telephone set having the for-specified-calling-party message reproducing and sending function has such a function of recording not only the message for the specified calling party but also a message from the specified calling party in answer to the message therefor (which message will hereinafter be referred to as the specified party answering message). This function will hereinafter be referred to as the for-specified-calling-party message and answering message recording function.

Also, it will be very convenient if the automatic answering telephone set having the for-specified-calling-party message reproducing and sending function has such a display function which indicates whether or not the message for the specified calling party reproducing and sending function is used.

SUMMARY OF THE INVENTION

Accordingly, one object of this invention is to provide a small, simple and inexpensive automatic answering telephone set which has the for-specified-calling-party message reproducing and sending function.

Another object of this invention is to provide an automatic answering telephone set which has the for-specified-calling-party message reproducing and sending function and which may readily accord with a change in the content of the call information for the specified calling party.

Another object of this invention is to provide an automatic answering telephone set which has the for-specified-calling-party message reproducing and sending function and the for-specified-calling-party message content changing function.

Another object of this invention is to provide an automatic answering telephone set which has the for-specified-calling-party message reproducing and sending function and the for-specified-calling-party message and answering message recording function.

Still another object of this invention is to provide an automatic answering telephone set which has the for-specified-calling-party message reproducing and sending function and the display function indicating whether the abovesaid function has been used or not.

Other objects, features and advantages of this invention will become apparent from the following description taken in conjunction with the accompanying drawings.

DESCRIPTION OF THE PREFERRED EMBODIMENTS

Figure 1:
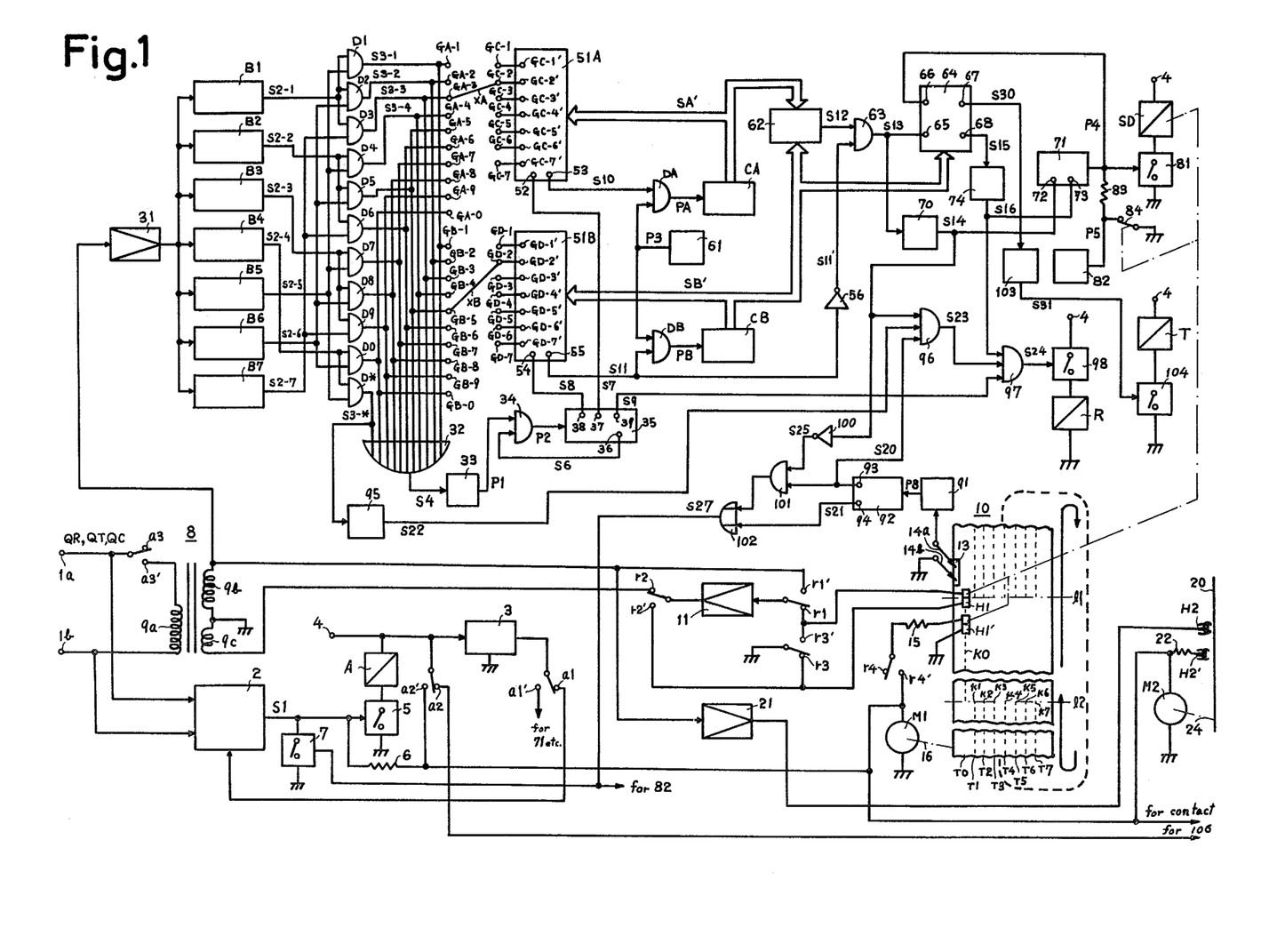
FIG. 1 is a connection diagram illustrating an embodiment of the automatic answering telephone set of this invention, except a display device.
Figure 2:
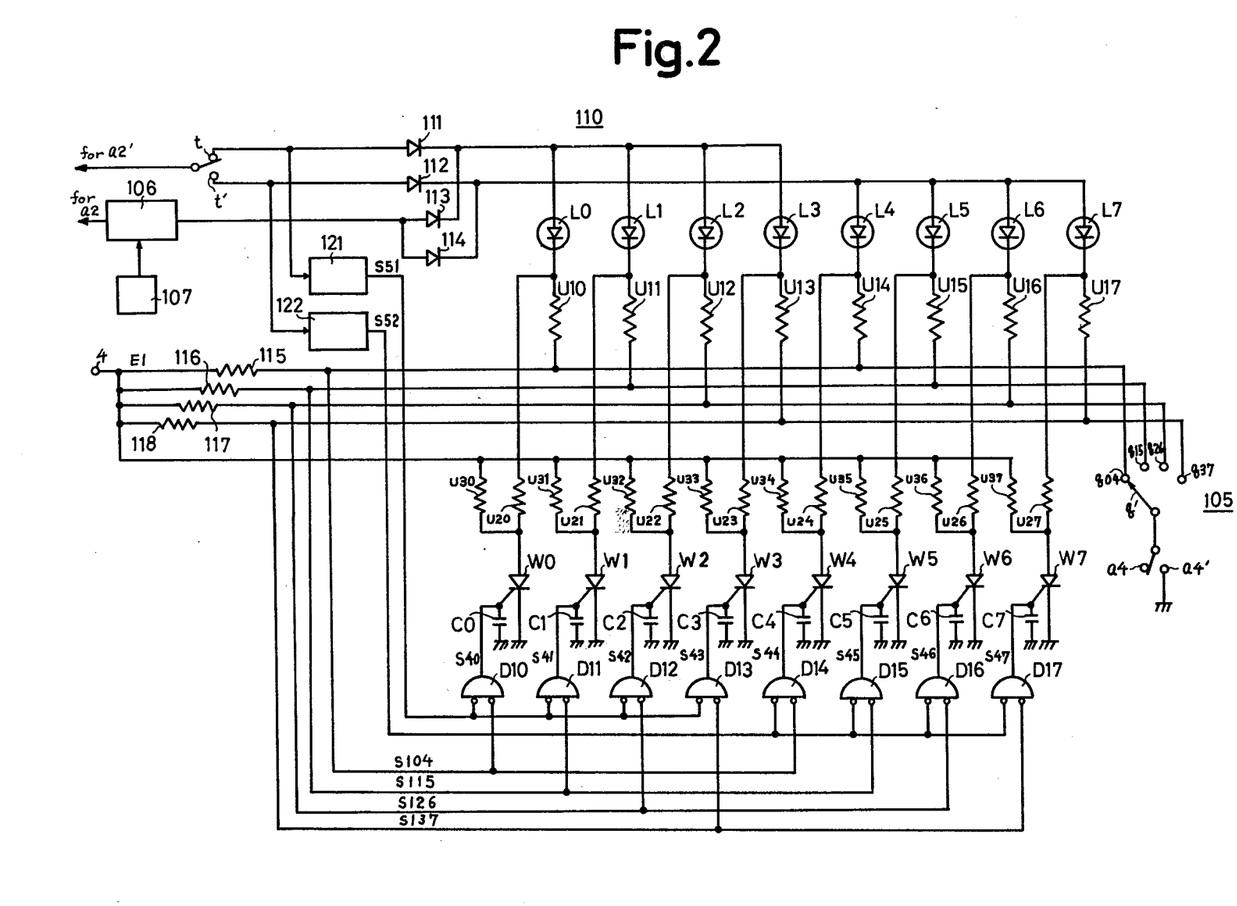
FIG. 2 is a connection diagram showing the display device.

FIGS. 1 and 2 illustrate an embodiment of the automatic answering telephone set of this invention, which has input terminals $1a$ and $1b$ connected to telephone lines (not shown) which is connected to an outside telephone set (not shown) through a telephone station and which is adapted so that a ringing signal QR applied across the input terminals $1a$ and $1b$ is supplied to a known ringing signal detector 2.

The detector 2 is adapted so that it is held in its operative state by a DC power source E2 from a power source circuit 3 through a normally closed contact $a1$ of a relay A described later and that it provides a detection signal S1 which is "1" or "0" in the binary representation depending upon whether or not the ringing signal QR is applied to the detector 2 in its operative state.

The power source circuit 3 has the so-called DC-DC converter structure that it is supplied with a DC power source E1 from a DC power source terminal 4 to provide the power source E2 as a lower voltage than the power source E1.

The detection signal S1 derived from the detector 2 is applied as a control to a switching circuit 5 which is formed, for instance, with a switching transistor connected between the DC power source terminal 4 and the ground through the relay A. Consequently, when the detection signal S1 is "1," the switching circuit 5 is turned ON to energize the relay A.

The relay A has normally closed contacts a1, a2, a3 and a4 (FIG. 2) and normally open contacts a1', a2', a3' and a4' (FIG. 2), so that energization of the relay A will alter the contacts a1 to a4 from the ON state to the OFF state and the contacts a1' to a4' from the OFF state to the ON state.

To the switching circuit 5 is applied as another control signal the DC power source E1 from the DC power source terminal 4 through the normally open contact a2' of the relay A and, if necessary, through a resistor 16. Consequently, even if the detection signal S1 becomes "0" after provided in the form of "1," the switching circuit 5 remains in its ON state. That is, once the relay A has been energized, the energized state is self-held.

Another switching circuit 7 is connected between the input side of the switching circuit 5 and the ground and is controlled by the output S27 from an OR circuit 102 described later. Accordingly, when the relay A is in its energized state, if the output S27 from the OR circuit 102 becomes "1," the switching circuit 7 is turned ON to ground the output S1 and hence turn OFF the switch 7, returning the relay A to its deenergized state.

On the other hand, when the relay A is energized by the ringing signal QR provided across the input terminals 1a and 1b, as described above, to close its normally open contact a3', the terminals 1a and 1b are connected to a primary winding 9a of a known line transformer 8 through the contact a3', providing the so-called channel. Accordingly, if a message is supplied to a tertiary winding 9c of the transformer 8 after the abovesaid channel is formed, the message is sent out to an outside telephone set through the primary winding 9a of the transformer 8 and a telephone line (not shown). If an outside calling party sends a message from an outside telephone set (which message will hereinafter be referred to as the message QT), the message is provided in a secondary winding 9b of the transformer 8 through a telephone line (not shown) and the primary winding 9a. Further, if the outside calling party sends the call information for the specified calling party (hereinafter referred to as the call information QC for the specified calling party) from an outside telephone set, the information is provided in the secondary winding 9b of the transformer 8 through a telephone line (not shown) and the primary winding 9a of the transformer 8.

The message to the tertiary winding 9c of the transformer 8 is supplied thereto from a recording and reproducing magnetic head H1 held in contact with an endless magnetic tape 10 through a normally closed contact r1 of a relay R described later, an amplifier 11 and another normally closed contact r2 of the relay R. In this instance, a coil of the magnetic head H1 is connected at one end to the input side of the amplifier 11 through the normally closed contact r1 of the relay R and grounded at the other end through another normally closed contact r3 of the relay R.

The endless magnetic tape 10 has eight tracks T0 to T7 sequentially arranged in the widthwise direction of the tape. Assume that the first track T0 has previously recorded thereon a message K0 for the general calling party from the position on a chain line l1 to the position on a chain line l2 spaced a predetermined distance apart from the chain line l1 and that the tracks T1 to T7 have recorded thereon in advance messages K1 to K7 for the specified calling party, respectively, from the position on the chain line l2 to the position on the chain line l1.

The magnetic tape 10 is driven endlessly by a motor M1 through a drive mechanism 16 indicated generally by the chain line. The motor M1 is driven by the power source E1 applied thereto from the aforementioned power source terminal 4 through the normally open contact a2' of the relay A.

On the other hand, the magnetic head H1 making contact with the magnetic tape 10 is shifted thereacross by an electromagnetic actuator SD described later, through a magnetic head shift mechanism 12, indicated generally by the chain line, together with an erase head H1' disposed adjacent the magnetic head H1. That is, the magnetic head H1 is shifted from the position where it selects the track T0 to the positions selecting the tracks T1 to T7 one after another and is then returned to the initial position. In the erase magnetic head H1', its coil is grounded at one end and connected at the other end to the power source terminal 4, if necessary, through a resistor 15, a normally open contact r4' of the relay R and the normally open contact a2' of the relay A, and the power source E1 from the power source terminal 4 is applied as an erase signal through the abovesaid route.

A conductive foil 13 is attached to the magnetic tape 10. On the stationary part, there are provided a contact 14a connected to a count pulse generator 91 and a contact 14b grounded. When the magnetic head H1 lies at the position on the chain line l1, the contacts 14a and 14b are short-circuited through the conductive foil 13.

The message applied from the outside to the secondary winding 9b of the transformer 8 through its primary winding 9a is supplied to one end of the magnetic head H1 through the normally open contact r1' of the relay R, the amplifier 11 and the normally open contact r2' of the relay R and, at the same time, the message is supplied through an amplifier 21 to a recording and reproducing magnetic head H2 making contact with a magnetic tape 20. In this case, an erase magnetic head H2' makes contact with the magnetic tape 20 adjacent the magnetic head H2. To the erase magnetic head H2' is supplied as an erase signal the power source E1 from the power source terminal 4 through the contact a2' of the relay A and, if necessary, through a resistor 22. The magnetic tape 20 is driven by a motor M2 through a drive mechanism 24 indicated generally by the chain line. The motor M2 is driven by the power source E1 applied thereto from the aforesaid power source terminal 4 through the contact a2' of the relay A.

In the case where an outside telephone set is a key telephone set having numeral keys "0" to "9" and a symbol key "*," the call information QC for the specified calling party, which is provided in the secondary winding 9b of the transformer 8 through its primary winding 9a, is obtained in the form of either one of the following information QC-N for the specified calling party and QC-M for the person in a position to give a message to the specified calling party. The information QC-N for the specified calling party is obtained by successively depressing a selected one of the ten numeral keys "0" to "9" of the outside telephone set and another key and is composed of a sequential arrangement of a frequency multiplex signal (identified generally by FA) indicative of the numeral of the former key and a frequency multiplex signal (identified generally by FB) indicative of the numeral of the latter key. The information QC-M is obtained by successively depressing a selected one of the ten numeral keys "0" to "9" of the external telephone set, another key and the symbol key "*", and is composed of a sequential arrangement of the abovesaid frequency multiplex signals FA and FB and a frequency multiplex signal (identified generally by FC) indicative of the symbol key "*".

Each of the frequency multiplex signals FA, FB and FC is a signal such that a signal having a selected one of seven sfrequencies f1 to f7 and another signal having a frequency different from the selected one are multiplexed. The frequency multiplex signals obtained by depression of the keys "1," "2," "3," "4," "5," "6," "7," "8," "9," "0" and "*" have frequencies f1 and f5, f1 and f6, f1 and f7, f2 and f5, f2 and f6, f2 and f7, f3 and f5, f3 and f6, f3 and f7, f4 and f6, and f4 and f5, respectively.

The information QC for the specified calling party is applied through an amplifier 31 to known discriminators B1, B2, B3, B4, B5, B6 and B7 for discriminating the signals having frequencies f1, f2, f3, f4, f5, f6 and f7, respectively.

From the outputs of the discriminators B1, B2, B3, B4, B5, B6 and B7, there are respectively provided discriminated outputs S2-1, S2-2, S2-3, S2-4, S2-5, S2-6 and S2-7 which are "1" or "0" in the binary representation depending upon whether or not the frequencies of the frequency multiplex signals FA, FB and FA to FC are respectively selected ones of the frequencies f1, f2, f3, f4, f5, f6 and f7.

The discriminated outputs S2-1 and S2-5, S2-1 and S2-6, S2-1 and S2-7, S2-2 and S2-5, S2-2 and S2-6, S2-2 and S2-7, S2-3 and S2-5, S2-3 and S2-6, S2-3 and S2-7, S2-4 and S2-6, and S2-4 and S2-5 are respectively supplied in such pairs to the AND circuits D1, D2, D3, D4, D5, D6, D7, D8, D9, D0 and D* corresponding to the numerals "1," "2," "3," "4," "5," "6," "7," "8," "9" and "0" and the symbol "*", respectively.

As a result of this, there are derived at the outputs of the AND circuits D1, D2, D3, D4, D5, D6, D7, D8, D9, D0 and D* outputs S3-1, S3-2, S3-4, S3-5, S3-6, S3-7, S3-8, S3-9, S3-0 and S3-* each of which is "1" or "0" in the binary representation depending upon whether the both outputs of each of the pairs S2-1 and S2-5, S2-1 and S2-6, S2-1 and S2-7, S2-2 and S2-5, S2-2 and S2-6, S2-2 and S2-7, S2-3 and S2-5, S2-3 and S2-6, S2-3 and S2-7, S2-4 and S2-6, and S2-4 and S2-5 are "1" or either one or both of the outputs of each output pair are "0" in the binary representation.

The resulting outputs S3-1, S3-2, . . . S3-9 and S3-0 are supplied to pairs of connection terminals GA-1 and GB-1, GA-2 and GB-2, . . . GA-9 and GB-9, and GA-0 and GB-0, respectively. Further, the outputs S3-1, S3-2, S3-3, . . . S3-9, S3-0 and S3-* are respectively fed to an OR circuit 32.

The output S4 from the OR circuit 32 is applied to the count pulse generator 33, which is adapted to provide a count pulse P1 at the moment when the output S4 changes from "0" to "1" in the binary representation. The count pulse P1 is supplied to one input of an AND circuit 34, which is supplied at the other input with the output S6 from an output terminal 36 of a counter 35. Consequently, when supplied with the output S6 in the state of "1" in the binary representation, the AND circuit 34 permits the passage therethrough of the pulse P1. The output pulse P2 from the AND circuit 34 based on the pulse 1 is applied as a count pulse to the counter 35.

The counter 35 has three output terminals 37, 38 and 39 other than the abovesaid one 36, and is constructed as follows:

The counter 35 provides at the output terminal 36 the output S6 in the form of "1" or "0" in the binary representation depending upon whether the counter 35 has counted less than four or more than three pulses P2 from the AND circuit 34. The counter 35 derives at the output terminal 37 an output S7 in the form of "0" except in the case of having counted one pulse P2. Further, the counter 35 provides at the output terminal 38 an output S8 in the form of "0" except in the case of having counted two pulses P2. Further, the counter 35 provides at the output terminal 39 an output S9 in the form of "0" except in the case of having counted three pulses P2.

A set of connection terminals GC-1, GC-2, . . . GC-7 are provided corresponding to the aforesaid set of connection terminals GA-1, GA-2, . . . GS-9 and GA-0 and, similarly, a set of connection terminals GD-1, GD-2, . . . GD-7 is provided corresponding to the set of connection terminals GB-1, GB-2, . . . GB-9 and GB-0. The connection terminals GC-1 to GC-7 and GD-1 to GD-7 of the two sets respectively correspond to the seven tracks T1 to T7 of the endless magnetic tape 10 mentioned previously.

The connection terminals GC-1, GC-2, . . . GC-7 are connected to encoder input terminals GC-1', GC-2', . . . GC-7' of an encoder-comparator circuit 51A, respectively.

The circuit 51A is supplied at its control input terminal 52 with the output S7 derived from the aforesaid counter 35. When the output S7 is "1," the circuit 51A becomes operative, in which case when inputs "1" are applied to the input terminals GC-1', GC-2', GC-3', GC-4', GC-5', GC-6' and GC-7', the circuit 51A generates therein binary coded outputs of the binary numbers "1," "2," "3," "4," "5," "6" and "7" (which outputs will hereinafter as the binary coded output SA).

Further, the circuit 51A compares the abovesaid binary coded output SA with a binary coded output SA' supplied from a counter CA described later to provide the compared output S10 at an output terminal 53. In this case, the compared output S10 is "0" or "1" depending upon whether or not the contents of the binary coded outputs SA and SA' match each other.

The connection terminals GD-1, GD-2, . . . GD-7 are respectively connected to encoder input terminals GD-1', GD-2', . . . GD-7' of an encoder-comparator circuit 51B similar to the abovesaid one 51A.

The circuit 51B is supplied at its control terminal 54 with the output S8 derived from the aforesaid counter 35 and becomes operative when the output S8 becomes "1." In such an operative state, when inputs "1" are applied to the input terminals GD-1', GD-2', . . . GD-7', the circuits 51B generates therein binary coded outputs of the binary numbers "1," "2," . . . "7" (which outputs will hereinafter be referred to as the binary coded output SB).

Further, the circuit 51B compares the abovesaid binary coded output SB with a binary coded output SB' supplied from a counter CB described later to provide the compared output S11 at an output terminal 55. In this instance, the compared output S11 is provided in the form of "0" or "1" depending upon whether or not the binary coded outputs SB and SB' match each other.

The output S10 and S11 derived from the encoder-comparator circuits 51A and 51B are respectively applied to one input of an AND circuit DA and one input of an AND circuit DB which are supplied at the other inputs with count pulses P3 from a count pulse generator 61. The AND circuits DA and DB pass therethrough the count pulses P3 when the outputs S10 and S11 are both "1."

Pulses PA and PB based on the pulses P3 derived from the AND circuits DA and DB are supplied to counters CA and CB, respectively, to provide therefrom the binary coded outputs SA' and SB' of the counted numbers of the pulses PA and PB, which outputs SA' and SB' are fed to a comparator 62.

The comparator 62 compares the outputs SA' and SB' to provide an output S12 which is "1" or "0" depending upon whether or not the contents of the both outputs SA' and SB' match each other.

The output S12 is supplied to one input of an AND circuit 63, which is supplied at the other input with the output S11' from the inverter 56 supplied with the output S11 from the abovesaid encoder-comparator circuit 51B. The AND circuit 63 derives therefrom an output S13 which is "1" or "0" depending upon whether the outputs S11' and S12 are both "1" or either one or both of the outputs S11 and S12 are "0."

The output S13 from the AND circuit 63 is applied to an input terminal 65 of a presettable counter 64, which is also supplied with the binary coded output SB' from the aforementioned counter CB. Consequently, the counter 64 is preset to have the content of the binary coded output SB' when the output S13 becomes "1."

Further, the output S13 from the AND circuit 63 is applied to a flip-flop 70 to set it to provide an output S14 which changes from "0" to "1" at the moment when the output S13 changes from "0" to "1." The output S14 is supplied to a start control terminal 72 of a pulse generator 71.

Further, the pulse generator 71 is supplied at its stop control terminal 73 with an output S16 from a flip-flop 74 described later. When the output S14 fed to the terminal 72 becomes "1" with the output S16 to the terminal 73 "0," the pulse generator 71 starts its operation, and stops the operation when the output S16 is altered to "1."

To the abovesaid counter 64 is applied through its input terminal 66 the pulse P4, as a count pulse, from the pulse generator 71. The counter 64 is so designed that upon each counting of the pulse P4, the content of the counter 64 becomes smaller than its preset value by a decimal number "1." When the content of the counter 64 reaches "0" in terms of decimal number, there is obtained from an output terminal 68 an output S15 which alters from "0" to "1" in the binary representation. This output S15 is applied to a flip-flop 74 to set it.

The flip-flop 74 generates an output S16 which changes from "0" to "1" from the moment when the output S15 alters from "0" to "1." The output S16 is supplied to the control terminal 73 of the pulse generator 71. Consequently, while the pulse generator 71 is operative, if the output S16 becomes "1," the pulse generator 71 becomes inoperative.

The output side of the pulse generator 71 is connected to the control input side of a switching circuit 81 connected between the power source terminal 4 and the ground through the electromagnetic actuator SD such as a plunger solenoid. Further, the control input side of the switching circuit 81 is connected to the output side of another pulse generator 82 through a resistor 83. The output side of the pulse generator 82 is grounded through a switch 84 which is associated with the electromagnetic actuator SD and is closed only when the aforesaid magnetic heads H1 and H1' select the track T0 on the magnetic tape 10.

In this case, the pulse generators 82 and 71 are adapted to be made operative by the power source E2 applied thereto from the power source circuit 3 through the normally closed contact a1 and the normally open contact a1' of the aforementioned relay A.

Accordingly, in the state in which the magnetic heads H1 and H1' select the track T0 of the magnetic tape 10, with the relay A deenergized, the pulse generator 71 cannot generate the pulse P4 but the pulse generator 82 generates the pulse P5. However, the pulse P5 is grounded through the switch 84, so that the electromagnetic actuator SD does not operate. In such a state, if the relay A is energized, the pulse generator 71 is permitted to generate the pulse P4 but the pulse generator 82 cannot generate the pulse P5. When the pulse generator 71 generates the pulse P4, even if the switch 84 is closed, the pulse P4 is supplied to the switching circuit 81 by the presence of the resistor 83 to turn ON the switching circuit 81. Upon turning ON of the switching circuit 81, the electromagnetic actuator SD operates, by which the magnetic heads H1 and H1' are moved through the magnetic head shift mechanism 12 from the position of selecting the track T0 of the magnetic tape 10 to the position of selecting the track T1. For instance, when five pulses P4 are sequentially obtained, the switching circuit 81 are turned ON five times, so that the magnetic heads H1 and H1' assume the position where they select the track T5. Thus, when the magnetic heads H1 and H1' have been brought to the position where they select any one of the tracks other than the track T0, the switch 84 is turned OFF. After such a state is obtained, if the relay A is deenergized, its contacts a1 and a1' are turned ON and OFF, respectively, to inhibit the pulse generator 71 from generation of the pulse P4, but the pulse generator 82 produces the pulse P5. Since the switch 84 is in the OFF state, the pulse P5 is supplied through the resistor 83 to the switching circuit 81 to turn it ON, actuating the electromagnetic actuator SD. When the magnetic heads H1 and H1' lie, for example, at their track T5 selecting position, if two pulses P5 are sequentially obtained and if one pulse P5 is provided next, the magnetic heads H1 and H1' select the tracks T6 and T7 one after another with the first two pulses and then select the track T0 with the latter pulse. When the magnetic heads H1 and H1' select the track T0, the switch 84 is turned ON and even if the pulse generator 82 generates the pulse P5, it is not fed to the switching circuit 81. Consequently, the magnetic heads H1 and H1' stay at their initial position where they select the track T0.

The contacts 14a and 14b, which are in contact with the conductive foil 13 attached to the magnetic tape 10, as described previously, are connected to a count pulse generator 91 and grounded, respectively. Since the contact 14a is grounded through the conductive foil 13 and the contact 14b at every rotation of the magnetic tape 10, a pulse P7 of each rotation of the magnetic tape 10 is applied to the count pulse generator 91. As a result of this, the count pulse generator 91 provides a count pulse P8 based on the pulse of each rotation of the magnetic tape 10, which count pulse P8 is applied to a counter 92.

The counter 92 is adapted to provide at its one output terminal 93 an output S20 which is "0" except in the case of counting one pulse P8 and to provide at its other terminal 94 an output S21 which is "0" except in the case of counting three pulses P8.

The output S20 from the counter 92 is supplied to an AND circuit 96 together with the output S14 from the aforesaid flip-flop 70 and an output S22 from another flip-flop 95 to derive from the AND circuit 96 an output S23 which is "1" or "0" depending upon whether the outputs S20, S22 and S14 are all "1" or at least any one of them is "0." In this case, the flip-flop 95 receives the output S3-* from the aforesaid AND circuit D* and is adapted to provide an output S22 which alters from "0" to "1" from the moment when the output S3-* changes from "0" to "1."

The output S23 from the AND circuit 96 is applied to another AND circuit 97 together with the output S16 from the aforementioned flip-flop 74 and the output S9 from the counter 35 to derive from the AND circuit 97 an output S24 which is "1" or "0" depending upon whether the three outputs S9, S16 and S23 are all "1" or at least any one of them is "0."

The output S24 from the AND circuit 97 is applied as a control signal to a switching circuit 98 which is connected between the power source terminal 4 and the ground through the recording and reproducing switching relay R. Consequently, when the output S24 becomes "1," the switching circuit 98 is turned ON to energize the relay R. Energization of the relay R turns OFF its normally closed contacts r1 to r3 and ON its normally open contact r1' to r3'.

The output S14 from the aforesaid flip-flop 70 is supplied to an inverter 100 to provide therefrom an output S25 that the output S14 is inverted in its binary representation.

The output S25 from the inverter 100 is fed to an AND circuit 101 together with the output S20 from the abovesaid counter 92 to obtain therefrom an output S26 which is "1" or "0" depending upon whether the outputs S25 and S20 are both "1" or either one of them is "0."

This output S26 is applied to an OR circuit 102 together with the output S21 from the counter 92 to derive therefrom an output S27 which is "1" or "0" depending upon whether at least either one of the outputs S26 and S21 is "1" or both of them are "0." The output S27 thus obtained is supplied as a control signal to the aforesaid switching circuit 7 to turn it ON when the output S27 is "1," grounding the output S1.

The abovesaid counter 64 is adapted to provide the output S15 from the output terminal 68, as described above, and is further designed to derive at its output terminal 67 an output S30 which is "0" or "1" depending upon whether the counter 64 has counted less than four or more than three pulses P4 from the pulse generator 71.

The output S30 is applied to a flip-flop 103 to obtain therefrom an output S31 which alters from "0" to "1" at the moment when the output S30 changes from "0" to "1." This output S31 is supplied as a control signal to a switching circuit 104 connected between the power source terminal 4 and the ground through a display relay T. Consequently, when the output S31 is "1," the switching circuit 104 is turned ON, thereby energizing the relay T.

The relay T has a normally closed contact t and a normally open contact t' which are utilized in a display circuit 110 shown in FIG. 2.

The display circuit 110 has light emitting elements L0, L1, L2, . . . L7 such, for example, as luminescent diodes, corresponding to the tracks T0, T1, T2, . . . T7 of the magnetic tape 10. The light emitting elements L0 to L3 are connected at one end to the power source terminal 4 through a diode 111 as a unidirectional element common to the elements, through the normally closed contact t of the relay T and through the normally open contact a2' of the relay A shown in FIG. 1. In a similar manner, the light emitting elements L4 to L7 are connected at one end to the power source terminal 4 through a diode 112, the normally open contact t' of the relay T and the contact a2' of the relay A.

The light emitting elements L0, L1, . . . L7 are each connected at the other end to one end of each of resistors L110, L111, . . . L117. On the other hand, pairs of resistors L110 and L114, L111 and L115, L112 and L116, and L113 and L117 are connected at the other end to fixed contacts q04, q15, q26 and q37 of a rotary switch 105 and to the power source terminal 4 through resistors 115, 116, 117 and 118, respectively.

A movable contact q' of the rotary switch 105 is associated with the electromagnetic actuator SD shown in FIG. 1 and is designed to lie at the position of the contact q04 when the magnetic heads H1 and H1' stay at the position of selecting the track T0 of the magnetic tape 10 and to shift from the contact q04 to the contacts in the order q15-q26-q37-q04-q15- . . . following the operation of the electromagnetic actuator SD. Further, the movable contact q' is grounded through the normally open contact a4' of the relay A.

Accordingly, for instance, in the case where the relay T is not energized in the state in which the relay A is energized, if the movable contact q' of the rotary switch 105 lies, for example, at the position of the contact q15, the light emitting element L1 is lighted to indicate that the magnetic heads H1 and H1' lie at the position of selecting the track T1 of the magnetic tape 10. Where the relay T is energized in the state in which the relay A is energized, if the movable contact q' of the rotary switch 105 lies, for instance, at the position of the contact q26, the light emitting element L6 is lighted to indicate that the magnetic heads H1 and H1' stay at the position of selecting the track T6 of the magnetic tape 10.

The light emitting elements L0 to L3 and L4 to L7 are connected at one end to the output side of a common power source modulator 106 through a diode 113 and through another diode 114, respectively. In this case, the modulator 106 is connected to the power source terminal 4 through the normally closed contact a2 of the relay A shown in FIG. 1. The modulator 106 is supplied with a modulation signal S107 having a flicker frequency from a modulation signal source 107. Consequently, the modulator 107 provides a flicker power source E3 that the voltage of the power source E1 is amplitude modulated.

On the other hand, the other ends of the light emitting elements L0, L1, ... L7 are respectively connected, if necessary, through resistors L120, L121, ... L127 to the anodes of semiconductor controlled rectifier elements W0, W1, ... W7 such as SCRs, whose cathodes are grounded.

In this instance, the elements W0, W1, W2, ... W7 are supplied at their gates with the outputs S40, S41, S42, ... S47 from NAND circuits D10, D11, D12, ... D17, respectively, and are supplied at their anodes with the power source E1 from the power source terminal 4, if necessary, through resistors L130, L131, L132, ... L137, respectively.

It is preferred to connect capacitors C0, C1, ... C7 between the gates of the elements W0, W1, ... W7 and the ground, respectively.

NAND circuits D10 and D14, D11 and D15, D12 and D16, and D13 and D17 are connected at one end to the power source terminal 4, if necessary, through resistors 115, 116, 117 and 118, respectively, and to the contacts q04, q15, q26 and q27 of the rotary switch 105, respectively. The other inputs of the NAND circuits D10 to D13 and D14 to D17 are connected to the output sides of time constant circuits 121 and 122, respectively. Consequently, each of outputs S104, S115, S126 and S137, which are "0" when the movable contact q' of the rotary switch 105 stays at the positions of the contacts q04, q15, q26 and q27, respectively, is applied to one of the NAND circuits of each of the pairs D10 and D14, D11 and D15, D12 and D16, and D13 and D17.

The input sides of time constant circuits 121 and 122 are connected to the contacts t and t' of the relay T, respectively, and are further connected to the power source terminal 4 through the contact a2' of the relay A, so that the power source E1 is applied to the time constant circuits 121 and 122, respectively.

The time constant circuits 121 and 122 are adapted to provide outputs S51 and S52, respectively, which changes from "1" to "0" after the lapse of time a little longer than that for the magnetic head H1 to reproduce the whole message K0 for the general calling party on the track T0 of the magnetic tape 10, for example, 20 seconds, after application of the power source E1 to the circuits 121 and 122, and which outputs S51 and S52 becomes "1" immediately upon disconnection of the power source E1 from the circuits 121 and 122.

Let it be assumed, for instance, that the relay A is energized to close its contact a2' but that the relay T is not energized and that the magnetic heads H1 and H2 are present on the track T0 of the magnetic tape 10, and accordingly the movable contact q' of the rotary switch 105 lies at the position of the contact q04. In such a case, for example, 20 seconds after the moment of energization of the relay A, the output S51 is provided in the form of "0" and the output S52 is obtained in the form of "1," so that the outputs S40 and S41 to S47 are obtained in the form of "1" and "0," respectively. Consequently, only the semiconductor controlled rectifier element W0 is turned ON and thereafter remains unchanged. Accordingly, upon restoration of the relay A from such a state, only the light emitting element L0 is energized by the power source E3 to flicker, indicating that the magnetic head H1 has reproduced the track T0 of the magnetic tape 10. Further, when the relays A and T are energized and when the magnetic heads H1 and H1' are brought to the position of reproducing the track, for example, T5, on the magnetic tape 10, and accordingly the movable contact q' of the rotary switch 105 lies at the position of the contact, for instance, q15, the output S52 takes the value "0" and only the output S115 changes from "1" to "0," so that only the output S45 becomes "1." Consequently, only the semiconductor controlled rectifier element W5 is turned ON and thereafter remains in the ON state. Accordingly, upon restoration of the relay A from such a state, only the light emitting element L5 is energized by the power source E3 to flicker, thus indicating that the magnetic head H1 or H1' has reproduced the track T5 of the magnetic tape 10.

The foregoing has described the construction of one embodiment of the automatic answering telephone set of this invention and the following will describe its operation.

[I] Standby State

Assume that the relays A, R and T are in their deenergized state, that the counters 35, CA, CB, 64 and 92 are all reset and that their contents are all "0" in terms of decimal number. Assume that the flip-flops 70, 74, 95 and 103 are all reset and that the outputs S14, S16, S22 and S31 are all "0" in the binary representation. Further, assume that the magnetic heads H1 and H1' making contact with the magnetic tape 10 lie at the beginning of the track T0, that is, on the line l1. Although the relay A is in its deenergized state, the power source E2 is supplied to the ringing signal detector 2 from the power source circuit 3 through the normally closed contact a1 of the relay A, so that the ringing signal detector 2 is in its operable state. The above state is referred to as the standby state.

[II] Reproduction and Sending of Message for General Calling Party

Upon application of the ringing signal QR across the input terminals 1a and 1b from an outside telephone set in such a standby state, the ringing signal detector 2 provides the output S1 in the form of "1" to turn ON the switching circuit 5, energizing the relay A. The relay A is held in its energized state by applying the power source E1 to the switching circuit 5 through the contact a2'. Since energization of the relay A closes its contact a1', the power source E2 is supplied to those circuits requiring the power source except the pulse generator 82, putting them in operation. Further, since the contact a3' of the relay A is closed, a channel is set up. On the other hand, since the contact a2' is also closed, the power source E1 is supplied through the contact a2' to the motors M1 and M2 to start them. As a result of this, the magnetic tape 10 is driven and the message K0 for the general calling party recorded on the track T0 is reproduced by the magnetic head H1 and is sent out to the outside telephone set through the contact r1, the amplifier 11, the contact r2 and the windings 9c and 9a of the transformer 8.

In this case, one portion of the message for the general calling party sent out of the outside telephone set is supplied to the magnetic head H2 through the windings 9c and 9b of the transformer 8 and the amplifier 21 and since the magnetic head H2' is supplied with the power source E1 through the contact a2', the message for the general calling party is recorded on the magnetic tape 20. Further, when the general calling party answering message is applied across the input terminals 1a and 1b from the outside telephone set in answer to the message for the general calling party, it is supplied through the amplifier 21 to the magnetic head H2 to be recorded on the magnetic tape 20.

Thus, when the magnetic tape 10 has been driven one turn, the contact 14a is grounded through the conductive foil 13 and the contact 14b to provide the pulse P7, so that the pulse generator 91 generates the pulse P8 and the content of the counter 92 becomes "1" in terms of decimal number, providing the output S20 in the form of "1." At this time, the output S25 from the inverter 100 to the AND circuit 101 is "0." Accordingly, the AND circuit 101 provides the output P26 in the form of "1" and, based on this output, the OR circuit 102 provides the output S27 in the form of "1," turning ON the switch 7. As a result of this, the switch 5 is turned OFF to deenergize the relay A, returning to the abovesaid standby state.

Thus, the operation for reproduction and sending of the message for the general calling party is completed.

[III] Reproduction and Sending of Message for Specified Calling Party

Assume that the information QC for the specified calling party is the information QC-N composed of a sequential arrangement of the aforementioned frequency multiplex signals FA and FB and that the content of the information is that obtained by successively depressing the numeral keys "3" and "5" of an outside telephone set and consequently "35" in decimal rotation. Further, assume that the message for the specified calling party, to which the abovesaid call information "35" is assigned, is recorded on the track T2 of the magnetic tape 2. In such a case, the pairs of connection terminals GA-3 and GC-2, and GB-5 and GD-2 are previously interconnected through jumper lines XA and XB, respectively.

Upon application of the ringing signal QR across the input terminals 1a and 1b from the output telephone set in the abovesaid standby state, the respective parts perform exactly the same operations as in the case of reproducing and sending of the message for the general calling party described in [II], the message for the general calling party is sent to the outside telephone set, and the message is recorded on the magnetic tape 10.

When the call information QC-N (whose content is "35" in terms of decimal rotation) for the specified calling party assigned thereto is applied across the input terminals 1a and 1b from the outside telephone side by successive depression of the numeral keys "3" and "5" of the outside telephone set by the specified calling party at the moment of completion of the message for the general calling party and before and after the moment, the call information QC-N is supplied to the inputs of the discriminators B1 to B7 through the amplifier 31. In this case, however, since the content of the information QC-N is "35" in decimal number, the outputs S2-1 and S2-7 from the discriminators B1 and B7 only become "1" in the binary representation. The reason is that the frequency multiplex signal FA forming the information QC-N together with the signal FB is a multiplex signal of a signal having the frequencies f1 and f7. When the outputs S2-1 and S2-7 become "1," only the output S3-3 from the AND circuit D3 becomes "1" and the output S4 from the OR circuit 32 alters to "1" to provide one shot of the pulse P1 from the pulse generator 33, which is supplied to the AND circuit 34. At this time, since the content of the counter 35 is "0" in decimal number, the output S6 fed to the AND circuit 34 is "1" in the binary representation. Therefore, the AND circuit 34 provides one shot of the pulse P2, which is applied to the counter 35 to make its content "1" in decimal number. Consequently, the output S7 becomes "1" in the binary representation, rendering the encoder-comparator circuit 51A operable. On the other hand, the output S3-3 is supplied to the input terminal GC-2 of the encoder-comparator circuit 51A through the jumper line XA and the output SA of the binary-coded decimal number obtained in the encoder-comparator circuit 51A has a content of "2" in decimal number. At this time, the content of the output SA' from the counter CA to the encoder-comparator circuit 51A is "0" in decimal number. Therefore, the output S10 from the encoder-comparator 51A is "1" in the binary representation, so that, based on the pulse P3 from the pulse generator 61, one shot of the pulse PA is obtained in the AND circuit DA and is applied to the counter CA, by which the content of its output SA' is made "1" in decimal number. However, since the content of the output SA' and that of the output SA do not match each other, the output S10 remains to be "1" in the binary representation. As a result, the pulse PA is applied to the counter CA until the content of its counter SA' becomes "2" in decimal number which is the same as the content of the output SA. When the content of the output SA' from the counter CA matches the content of the output SA, the output S10 becomes "0" in the binary representation, after which the pulse PA is not applied to the counter CA and the content of its output SA' remains to be "2" in decimal number.

Since the content of the information QC-N is "35" in decimal number, only the outputs S2-2 and S2-6 from the discriminators B2 and B6 become "1" in the binary representation. The reason is that, in this case, the frequency multiplex signal FB forming the information QC-N together with the signal FA is a multiplex signal of a signal having the frequencies f2 and f6. When the outputs S2-2 and S2-6 become "1," only the output S5-5 from the AND circuit D5 alters to "1" in the binary representation and the output from the OR circuit 32 becomes again "1" to obtain a second shot of the pulse P1 from the circuit 33, which is supplied to the AND circuit 34. At this time, since the content of the counter 53 is "1" in decimal number, the output S6 is "1" in the binary representation. Therefore, the AND circuit 34 provides a second shot of the pulse P2, which is supplied to the counter 35 to make its output "2" in decimal number. Consequently, the output S8 becomes "1" in the binary representation to render the circuit 51B operable. On the other hand, the output S3-5 is applied through the jumper line XB to the input terminal GD-2 of the encoder-comparator circuit 51B to make its output SB "2" in decimal number. At this time, the content of the output SB' from the counter CB to the circuit 51B is "0" in decimal number. Accordingly, the output S11 from the circuit 51 B is "1" in the binary representation, so that, based on the pulse P3 from the pulse generator 61, one shot of the pulse PB is obtained in the AND circuit DB and is supplied to the counter CB to derive therefrom the output SB' in the form of "1" in decimal number. However, since the content of the output SB' does not coincide with that of the output SB, the output S11 remains to be "1" in the binary representation. As a result, the pulse PB is supplied to the counter CB until the content of the output SB' becomes "2" in decimal number which is the same as the content of the output SB. When the content of the output SB' from the counter CB coincides with the content of the output SB, the output S11 becomes "0" in the binary representation. Thereafter, the pulse PB is not supplied to the counter CB and the content of its output SB' remains to be "2" in decimal number.

Where the content of the output SB' becomes "2" in decimal number, the content of the output SA' from the counter CA becomes "2" in decimal number. Accordingly, the output S12 from the comparator 62 becomes "1" in the binary representation and, on the other hand, since the output S11 is "0" in the binary representation at this time, the output S11' from the inverter 56 is also "1," so that the output S13 from the AND circuit 63 becomes "1" in the binary representation.

Since the output S13 becomes "1," the output SB' from the counter CB is preset in the counter 64 to make its content "2" in decimal number. On the other hand, since the output S13 have the content "1" in the binary representation, the output S14 from the flip-flop 70 becomes "1" and the pulse generator 71 starts its operation to produce the pulse P4, which is applied to the counter 64 until its content becomes "0" in decimal number. When the content of the counter 64 becomes "0," the output S15 becomes "1" in the binary representation, by which the output S16 from the flip-flop 74 is made "1" to stop the operation of the pulse generator 71, providing therefrom no pulse P4. Thus, two shots of the pulse P4 are derives from the pulse generator 71.

The two shots of the pulse P4 turn ON the switching circuit 81 twice to actuate the electromagnetic actuator SD twice, by which the magnetic heads H1 and H1' are brought from the track T0 selecting position to the track T2 selecting position on the magnetic tape 10. As a result of this, the message for the specified calling party recorded on the track T2 is reproduced by the magnetic head H1 and is sent out to the outside telephone set through the contact r1, the amplifier 11, the contact r2 and the transformer 8.

Consequently, the specified calling party, to which is assigned the call information for the specified calling party "35" in decimal number, is permitted to learn the message for the specified calling party.

Thus, when the magnetic tape 10 has been driven by one turn, the contact 14a is grounded through the conductive foil 13 and the contact 14b to obtain the pulse P7, so that the pulse P8 is provided from the circuit 91 and the content of the counter 64 becomes "1" in decimal number providing the output S20 in the form of "1." At this time, however, the outputs S14 from the flip-flop 70 is "1" in the binary representation, and consequently the output S25 from the inverter 100 is "0," so that the output S26 from the AND circuit 101 and accordingly the output S27 from the OR circuit 102 does not become "1" in the binary representation. As a result of this, the switching circuit 7 is not turned OFF and the relay A remains energized.

Thus, the magnetic tape is driven into a second round and then a third round and upon completion of the third round, one shot of the pulse P7 is obtained from the contact 14a. Consequently, three shots of the pulse P7 are obtained after the start of driving of the magnetic tape 10 and, similarly, three shots of the pulse P8 are provided from the circuit 91 to make the counter 92 have a content "3" in decimal number. When the content of the counter 92 becomes "3," the output S21 becomes "1" in the binary representation, so that the output S27 from the OR circuit 102 becomes "1" in the binary representation to turn ON the switch 7 and OFF the switch 5, deenergizing the relay A.

When the relay A is thus deenergized, since its contact a1 closes to pass the power source E2 to the pulse generator 82 and since the switch 84 connected to the output side of the pulse generator 82 is turned OFF before deenergization of the relay A, the pulse P5 from the pulse generator 82 is applied to the switching circuit 81 to repeatedly actuate the electromagnetic actuator SD, by which the magnetic heads H1 and H1' are brought to the position of the track K0 of the magnetic tape 10. Then, the switch 84 is turned ON, so that even if the pulse P5 is obtained, it is not supplied to the switching circuit 81. Thereafter, the electromagnetic actuator SD remains out of operation.

Thus, the aforesaid standby state is restored.

All messages, sent out to the outside telephone set before such a standby state is obtained, are recorded on the magnetic tape 20 and the answering message from the specified calling party, if any, is also recorded on the magnetic tape 20.

Thus, the operation of reproducing and sending the message for the specified calling party is completed.

The above description has been made on the assumption that the content of the call information QC-N for the specified calling party assigned thereto is "35" in decimal number and that the message for the specified calling party is recorded on the track T2 of the magnetic tape 10. However, the content of the call information QC-N for the specified calling party may also be any other desired number of two figures in decimal number and the meassage for the specified calling party may also be recorded on any other track of the magnetic tape 10. In such instance, the same results can be obtained by changing the connection of the jumper lines XA and XB correspondingly.

[IV] Change of Content of Message for Specified Calling Party

Assume that the content of the call information QC-N for the specified calling party assigned thereto is "35" in decimal number as in the case of [III]. Assume that the message for the specified calling party is recorded on the track T2 of the magnetic tape 10 as in the case of [III] and that the jumper lines XA and XB are connected in the same manner as in the case of [III].

The person who is in a position to give the message for the specified calling party will hereinafter be referred to as the manager for the sake of simplicity. When the ringing signal QR from an outside telephone set used by the manager is applied across the input terminals 1a and 1b, he can hear the message for the general calling party as in the case of [III] and the message is recorded on the magnetic tape 20.

Let it be assumed that the call information QC-N for the specified calling party, which has the same content as in the case of [III], that is, "35" in decimal number, is applied across the input terminals 1a and 1b from the outside telephone set used by the manager in exactly the same manner as in the case of [III].

In such an instance, the respective parts operate in exactly the same manner as in the case of [III] to bring the magnetic heads H1 and H1' from the track T0 selecting position to the track T2 selecting position on the magnetic tape 10.

Consequently, as in the case of [III], the manager can hear the message for the specified calling party assigned the call information which is "35" in decimal number.

At the moment when the magnetic tape 10 is driven into its second turn or before it, if the manager depresses the symbol key "*" of the outside telephone set to form the aforesaid call information QC-M with the frequency multiplex signals FA and FB forming the aforesaid call information QC-N, the frequency multiplex signals FC is applied across the input terminals 1a and 1b and is fed to the inputs of the discriminators B1 to B7 through the amplifier 31. In this case, however, since the signal FC is a multiplex signal of signals of the frequencies f4 and f5, the outputs S2-4 and S2-5 from the discriminators B4 and B5 become "1" in the binary representation.

Then, the output S3-* from the AND circuit D* becomes "1" in the binary representation. The output of the AND circuit D* is not connected to any of the connection terminals GA-0 toGA-9 and GB-0 to GB-9. Accordingly, the operative states of the respective parts described in [III] are not changed by the output S3-* having the content of "1" in the binary representation except the operative states of the OR circuit 32, the pulse generator 33, the AND circuit 34 and the counter 35. That is, when the output S3-* becomes "1," the output S4 from the OR circuit 32 becomes "1" to obtain one shot of the pulse P1 from the pulse generator 33. On the other hand, the content of the counter 35 is "2" and consequently the output S6 is "1" to provide one shot of the pulse P2 from the AND circuit 34, by which the content of the counter 35 is made "3" and the output S8 is made "0," rendering the encoder-comparator circuit 54 inoperative and making the output S9 "1."

However, by the output S3-* of the content "1" in the binary representation, the output S22 from the flip-flop 95 is made "1" and is applied to the AND circuit 96. In this case, the outputs S14 and S20 supplied to the AND circuit 96 from the flip-flop 70 and the counter 92, respectively, are both "1." Accordingly, the output S23 from the AND circuit 96 becomes "1" and is applied to the AND circuit 97. The outputs S16 and S9 fed to the AND circuit 96 from the flip-flop 74 and the counter 35, respectively, are both "1." Accordingly, the output S24 from the AND circuit 97 becomes "1" to turn ON the switching circuit 98, energizing the relay R.

Then, the contacts r1', r2', r3' and r4' of the relay R and turned ON to connect the secondary winding 9b of the transformer 8 to one end of the magnetic head H1 through the contact r1', the amplifier 11 and the contact r2' and the other end of the magnetic head H1 is grounded through the contact r3'. On the other hand, the power source E2 is applied as an erase signal to the magnetic head H1' through the contact r4'.

In this manner, there is obtained the state in which the content of the message for the specified calling party recorded on the track T2 of the magnetic tape 10 can be changed. Consequently, when a new message for the specified calling party is applied across the input terminals 1a and 1b from the outside telephone set used by the manager, the message is recorded on the track T2.

Thus, the magnetic tape 10 is driven into a second turn and when the second turn is completed, one shot of the pulse P7 is obtained from the contact 14a, so that one shot of the pulse P8 is derived from the circuit 91 and is applied to the counter 92. As a result of this, the content of the counter 92 becomes "2" in decimal number and the output S20 becomes "0" in the binary representation. Thus, the output S23 from the AND circuit 96 becomes "0" and the output S24 from the AND circuit 97 also becomes "0" in the binary representation to turn OFF the switching circuit 98, deenergizing the relay R.

Then, the contacts of the relay R are also restored. Consequently, the message for the specified calling party, newly recorded by the magnetic head H1 on the track T2, that is, changed in content, is reproduced and is sent out to the outside telephone set through the contact r1, the amplifier 11, the contact r2 and the transformer 8. Accordingly, the manager can confirm the new message for the specified calling party.

Then, the magnetic tape 10 is driven into a third turn and, upon completion of the third turn, one shot of the pulse P7 is obtained from the contact, so that one shot of the pulse P8 is obtained. Accordingly, the content of the counter 92 becomes "3" and consequently the respective parts operate in the same manner as described above in the case of [III] to deenergize the relay A and then the magnetic heads H1 and H1' are returned to the track T0 selecting position, restoring the standby state described in [I]. Thus, the operation of changing the content of the message for the specified calling party is completed.

[V] Display

In the case of the operation described above in [II], the magnetic heads H1 and H1' lies only at the position of the track T0 of the magnetic tape 10, so that the movable contact q' of the rotary switch 105 lies only at the position of the contact q04.

Accordingly, when the relay A is energized to turn ON its contact a2', the light emitting element L0 is lighted without flickering to indicate the position of the magnetic heads H1 and H1', as is evident from the above.

Then, when the relay A is deenergized, since the semiconductor controlled rectifier element W0 has been turned ON before deenergization of the relay A, that is, for example, 20 seconds after closure of the contact a2', as is apparent from the above, the light emitting element L0 is lighted to flicker, indicating that the operation of reproducing and sending the message for the general calling party has taken place.

In the case of the operation described above is [III], the magnetic heads H1 and H1' was shifted from the position of the track T0 on the magnetic tape 10 to the position of the track T2 past the position of the track T1 to reproduce the message for the specified calling party, thereafter being returned to the position of the track T0 past the positions of the tracks T3, T4, T5, T6 and T7. Accordingly, the movable contact q' of the rotary switch 101 moved from the position of the contact q04 to the position of the contact q26 past the position of the contact q15 and stayed at the position of the contact q26 for a relatively long time, and then returned to the position of the contact q04 across the contacts q37, q04, q15, q26 and q37.

Accordingly, in the case of the operation described in [III], the relay A is energized to turn ON the contact a2 and OFF a2' and the message for the specified calling party is reproduced and sent. Then, when the relay A is deenergized to turn OFF the contact a2' and ON a2, the light emitting elements L0, L1, . . . L7 are sequentially lighted. In this case, however, the light emitting elements L0 and L2 are lighted to flicker before the magnetic heads H1 and H1' are brought from the position of the track T0 to the position of the track T1 and before the magnetic heads are brought from the position of the track T2 to the position of the track T3, respectively, and these light emitting elements still remain flickering after the magnetic heads H1 and H1' are returned to the position of the track T0. Thus, it is indicated that the message for the specified calling party has been reproduced and sent.

In the case of the operation described in [IV], since the mode of shift of the magnetic heads H1 and H1' and accordingly the mode of shift of the movable contact q' of the rotary switch 105 is exactly the same as in the case of the operation described above in [III], the same display as described above in [III] is provided.

It will be apparent that many modifications and variations may be effected without departing from the scope of the novel concepts of this invention.

What is claimed:

1. An automatic telephone answering set comprising:
   (a) an endless magnetic medium means having first and second half portions successively disposed along the length thereof so that as said endless magnetic medium is driven the first half portion is encountered prior to the second half portion, said endless magnetic medium including (1) a first endless track where there is pre-recorded in said first half portion of the endless magnetic medium a message for a general calling party and (2) a plurality of further endless tracks in which there is prerecorded in said second half portion of the endless magnetic medium a message for a specified calling party so that after said general calling party message is reproduced, one of said specified calling party messages can be reproduced without having to rewind said endless magnetic medium;
   (b) a magnetic head for (1) selectively reproducing the message for the general calling party and the messages for the specified calling parties and (2) selectively recording new messages for the specified calling parties on the endless tracks therefor of the endless magnetic medium means in place of the pre-recorded messages for the specified calling parties;
   (c) drive means for driving the endless magnetic medium;
   (d) means for selectively moving the magnetic head to the portions of the endless tracks for the specified calling parties from the portion of the endless track for the general calling party;
   (e) message sending means for (1) selectively sending to a telephone line the message reproduced by the magnetic head from the endless track for the general calling party and the messages reproduced by the magnetic head from the endless tracks for the specified calling parties and (2) selectively sending to the magnetic head the new messages for the specified calling parties derived from the telephone line;
   (f) ringing signal responsive means for providing an output in response to a ringing signal derived from the telephone line;
   (g) call information responsive means for providing a first output in response to first call information for the specified calling parties derived from the telephone line and a second output in response to second call information derived from the telephone line for a person in a position to give a message to the specified calling parties, said second call information comprising a first information part identical with said first call information and a second information part following the first information part;
   (h) first control means for (1) controlling the drive means to drive said first endless track of the endless magnetic medium means by the magnetic head to thereby reproduce the message for the general calling party and (2) controlling the message sending means to send the reproduced general calling party message to the telephone line, said first control means being responsive to the output from the ringing signal responsive means when only the ringing signal is derived from the telephone line;
   (i) second control means for (1) controlling first the drive means to drive said first endless track of the endless magnetic medium means by the magnetic head to thereby reproduce the message for the general calling party, (2) controlling the message sending means to send the reproduced general calling party message to the telephone line, said second control means being first responsive to the output from the ringing signal responsive means and then (3) controlling the magnetic head moving means to bring the magnetic head to a selected endless track for a specified calling party and then drive said selected track by the magnetic head to thereby selectively reproduce the pre-recorded specified calling party message and to send it to the telephone line by the message sending means, said second control means being further responsive to said first output from the call information responsive means when there is only sequentially applied thereto the ringing signal and said first information part of the call information signal whereby said specified calling party message can be reproduced after said general calling message without having to rewind said endless magnetic medium means; and
   (j) third control means for (1) controlling first the drive means to drive said endless track of the endless magnetic medium means by the magnetic head to thereby reproduce the message for the general calling party, (2) controlling the message sending means to send the reproduced general calling party message to the telephone line, said third control means being first responsive to the output from the ringing signal responsive means, then (3) controlling the magnetic head moving means to bring the magnetic head to a selected endless track for a specified calling party, and then (4) controlling the message sending means to selectively send a new message for the specified calling party from the telephone line to the magnetic head to record on said selected endless track the new message for the specified calling party, said third control means being responsive to said second output from the call information responsive means when there is only sequentially applied thereto the ringing signal from the telephone line, the said first information part of a selected call information from a person in a position to give a message to the specified calling party from the telephone line, the said second information part of the selected call information from the telephone line and said new message for the specified calling party from the telephone line via the message sending means.

2. An automatic telephone answering set according to claim 1, including means for moving the magnetic head back to the endless track for the general calling party from said selected endless track for the specified calling party, the magnetic head moving back means including an electromagnetic actuator mechanism, fourth control means for energizing the electromagnetic actuator mechanism after reproducing the pre-recorded message from the selected endless track for the specified calling party, said fourth control means being actuated whenever said second control means is actuated, and fifth control means for energizing the electromagnetic actuator mechanism after completion of recording the new message on the selected endless track for a specified calling party, said fifth control means being actuated whenever said third control means is actuated.

3. An automatic telephone answering set according to claim 1, including means for recording a general calling party answering message after reproducing the pre-recorded message for the general calling party, said latter means being actuated whenever said first control means is actuated, and means for recording a specified calling party answering message after reproducing the pre-recorded message for the specified calling party, said latter means being actuated whenever said second control means is actuated.

4. An automatic telephone answering set according to claim 1, including a first display means which is energized in response to actuation of said first control means, and a second display means which is energized in response to actuation of said second control means.

* * * * *